(12) United States Patent
Kramer et al.

(10) Patent No.: US 7,005,044 B2
(45) Date of Patent: Feb. 28, 2006

(54) METHOD OF FABRICATING A BELT AND A BELT USED TO MAKE BULK TISSUE AND TOWEL, AND NONWOVEN ARTICLES AND FABRICS

(75) Inventors: Charles E. Kramer, Walpole, MA (US); Joseph G. O'Connor, Hopedale, MA (US); John Skelton, Sharon, MA (US); Maurice Paquin, Plainville, MA (US)

(73) Assignee: Albany International Corp., Albany, NY (US)

( * ) Notice: Subject to any disclaimer, the term of this patent is extended or adjusted under 35 U.S.C. 154(b) by 112 days.

(21) Appl. No.: 10/334,211

(22) Filed: Dec. 31, 2002

(65) Prior Publication Data

US 2004/0126601 A1   Jul. 1, 2004

(51) Int. Cl.
  *D21F 1/10*  (2006.01)
  *B05D 1/12*  (2006.01)
  *B05D 5/00*  (2006.01)
(52) U.S. Cl. ...................... 162/362; 162/116; 162/348; 162/361; 162/903; 428/195.1; 428/147; 442/76; 427/195; 427/244; 427/261; 427/288; 427/389.9
(58) Field of Classification Search ........ 162/203–207, 162/306, 348, 358.2, 358.4, 900–904, 109–117, 162/360–361; 156/459–460; 428/192–194, 428/195.1, 198, 200, 206, 212, 213, 220, 428/143, 147; 442/59, 76, 148; 474/266–268; 427/9, 447, 448, 466, 470, 487, 492, 508–510, 427/513, 140, 176, 189, 195, 196, 201, 203, 427/209, 210, 244, 258, 261, 265, 285, 288, 427/331, 355, 370, 372.2, 384, 389.9, 394
See application file for complete search history.

(56) References Cited

U.S. PATENT DOCUMENTS

| | | | | |
|---|---|---|---|---|
| 3,042,568 A | | 7/1962 | Ludowici et al. | ............ 156/137 |
| 3,149,003 A | | 9/1964 | Christie et al. | |
| 3,175,792 A | | 3/1965 | Smallian | ........................ 245/8 |
| 3,350,260 A | | 10/1967 | Johnson | ...................... 162/116 |
| 3,501,366 A | | 3/1970 | Bramley et al. | |
| 3,549,742 A | * | 12/1970 | Benz | ........................... 264/250 |
| 3,613,258 A | | 10/1971 | Jamieson | ....................... 34/95 |

(Continued)

FOREIGN PATENT DOCUMENTS

DE   196 51 557   6/1998

(Continued)

OTHER PUBLICATIONS

S. Ashley, Rapid Prototyping Systems, *Mechanical Engineering*, Apr. 1991, pp. 34-43.

*Primary Examiner*—Eric Hug
(74) *Attorney, Agent, or Firm*—Frommer Lawrence & Haug LLP; Ronald R. Santucci

(57) ABSTRACT

In a method for manufacturing a belt and a belt for use in the production of bulk tissue and towel, and of nonwoven articles and fabrics, a polymeric resin material is applied onto the surface of a base substrate in a precise predetermined pattern which is to be imparted onto products manufactured with the belt. The polymeric resin material is deposited in droplets having an average diameter of 10μ (10 microns) or more. The polymeric resin material is then set by means appropriate to its composition, and, optionally, may be abraded to provide the belt with a uniform thickness, and a smooth, macroscopically monoplanar surface.

46 Claims, 7 Drawing Sheets

U.S. PATENT DOCUMENTS

| | | | |
|---|---|---|---|
| 3,673,023 A | 6/1972 | Ross | 156/137 |
| 3,720,578 A | 3/1973 | Heling et al. | |
| 3,994,662 A | 11/1976 | Bramley | |
| 4,109,543 A | 8/1978 | Foti | 74/231 |
| 4,111,634 A | 9/1978 | Limbach et al. | |
| 4,187,618 A | 2/1980 | Diehl | 34/243 |
| 4,191,609 A | 3/1980 | Trokhan | 162/113 |
| 4,239,065 A | 12/1980 | Trokhan | 139/383 |
| 4,251,928 A | 2/1981 | Rotar et al. | 34/116 |
| 4,300,982 A | 11/1981 | Romanski | 162/358 |
| 4,312,009 A | 1/1982 | Lange | 346/140 |
| 4,382,987 A | 5/1983 | Smart | 428/212 |
| 4,383,495 A | 5/1983 | Plichta et al. | 118/406 |
| 4,427,734 A | 1/1984 | Johnson | 428/234 |
| 4,482,430 A | 11/1984 | Majaniemi | 162/358 |
| 4,514,345 A * | 4/1985 | Johnson et al. | 264/425 |
| 4,528,239 A | 7/1985 | Trokhan | 428/247 |
| 4,529,480 A | 7/1985 | Trokhan | 162/109 |
| 4,567,077 A | 1/1986 | Gauthier | 428/114 |
| 4,571,798 A | 2/1986 | Adams | |
| 4,637,859 A | 1/1987 | Trokhan | 162/109 |
| 4,752,519 A | 6/1988 | Boyer et al. | |
| 4,917,937 A * | 4/1990 | Lappanen et al. | 428/196 |
| 4,981,745 A * | 1/1991 | Lefkowitz | 428/147 |
| 5,066,532 A | 11/1991 | Gaisser | 428/137 |
| 5,084,326 A * | 1/1992 | Vohringer | 428/194 |
| 5,238,537 A | 8/1993 | Dutt | 162/358.4 |
| 5,240,531 A | 8/1993 | Toda et al. | 156/137 |
| 5,277,761 A | 1/1994 | Van Phan et al. | 162/109 |
| 5,292,438 A * | 3/1994 | Lee | 210/504 |
| 5,298,124 A | 3/1994 | Eklund et al. | 162/306 |
| 5,360,656 A | 11/1994 | Rexfelt et al. | 428/193 |
| 5,397,438 A | 3/1995 | Nyberg et al. | 162/207 |
| 5,422,166 A * | 6/1995 | Fleischer | 428/193 |
| 5,462,642 A * | 10/1995 | Kajander | 162/116 |
| 5,506,607 A | 4/1996 | Sanders, Jr. et al. | 347/1 |
| 5,515,779 A | 5/1996 | Danby | |
| 5,518,680 A | 5/1996 | Cima et al. | |
| 5,556,509 A | 9/1996 | Trokhan et al. | 162/111 |
| 5,672,248 A | 9/1997 | Wendt et al. | 162/109 |
| 5,679,222 A | 10/1997 | Rasch et al. | 162/358.1 |
| 5,713,399 A | 2/1998 | Collette et al. | 139/383 |
| 5,714,041 A * | 2/1998 | Ayers et al. | 162/111 |
| 5,731,059 A * | 3/1998 | Smith et al. | 428/192 |
| 5,733,608 A | 3/1998 | Kessel et al. | 427/547 |
| 5,740,051 A | 4/1998 | Sanders, Jr. et al. | 364/468.26 |
| 5,746,887 A | 5/1998 | Wendt et al. | 162/109 |
| 5,787,602 A | 8/1998 | Hsu et al. | 34/116 |
| 5,804,036 A | 9/1998 | Phan et al. | |
| 5,817,374 A | 10/1998 | Detig et al. | 427/466 |
| 5,817,377 A | 10/1998 | Trokhan et al. | |
| 5,829,488 A | 11/1998 | Fagerholm et al. | 139/383 |
| 5,849,395 A | 12/1998 | Valentine et al. | |
| 6,080,691 A | 6/2000 | Lindsay et al. | 442/381 |
| 6,099,781 A | 8/2000 | Ampulski | |
| 6,120,642 A | 9/2000 | Lindsay et al. | 162/109 |
| 6,136,151 A | 10/2000 | Davenport et al. | 162/306 |
| 6,136,157 A | 10/2000 | Lindeberg et al. | 204/157.6 |
| 6,193,847 B1 | 2/2001 | Trokhan | |
| 6,340,413 B1 | 1/2002 | Nilsson et al. | 162/361 |
| 6,350,336 B1 | 2/2002 | Paquin | 156/93 |
| 6,358,030 B1 | 3/2002 | Ampulski | |
| 6,358,594 B1 | 3/2002 | Ampulski | |
| 6,398,910 B1 * | 6/2002 | Burazin et al. | 162/109 |
| 6,419,795 B1 | 7/2002 | Dutt | |
| 6,576,090 B1 * | 6/2003 | Trokhan et al. | 162/348 |
| 2001/0035598 A1 | 11/2001 | Ampulski | |
| 2002/0107495 A1 | 8/2002 | Chen et al. | |

FOREIGN PATENT DOCUMENTS

| | | |
|---|---|---|
| EP | 0 487 477 | 5/1992 |
| EP | 0 568 509 | 11/1993 |
| EP | 0 613 729 | 9/1994 |
| EP | 0 677 612 A2 | 10/1995 |
| GB | 1 053 282 | 5/1963 |
| WO | WO 92/00415 | 1/1992 |
| WO | WO 93/00474 | 1/1993 |
| WO | WO 96/35018 | 11/1996 |
| WO | WO 97/14846 | 4/1997 |
| WO | WO 99/35332 | 7/1999 |
| WO | WO 00/09308 | 2/2000 |
| WO | WO 02/088464 A1 | 11/2002 |
| WO | WO 2004/045834 A1 | 6/2004 |

* cited by examiner

METHOD OF FABRICATING A BELT AND A BELT USED TO MAKE BULK TISSUE AND TOWEL, AND NONWOVEN ARTICLES AND FABRICS

BACKGROUND OF THE INVENTION

1. Field of the Invention

The present invention relates to the papermaking arts, and specifically to the manufacture of paper tissue and toweling, which may be collectively referred to as bulk tissue. The present invention also relates to the manufacture of nonwoven articles and fabrics by processes such as hydroentanglement. In particular, the present invention relates to belts, which have had a functional polymeric resin material deposited in precise preselected areas onto their base structures to fill those areas and, when desired, to form a layer of desired thickness thereover. Belts of this type are used in the manufacture of bulk tissue and towel, and of nonwoven articles and fabrics.

2. Background of the Invention

Soft, absorbent disposable paper products, such as facial tissue, bath tissue and paper toweling, are a pervasive feature of contemporary life in modern industrialized societies. While there are numerous methods for manufacturing such products, in general terms, their manufacture begins with the formation of an embryonic paper web in the forming section of a paper machine. The embryonic paper web is then transferred to a through-air-drying (TAD) fabric by means of an air flow, brought about by vacuum or suction, which deflects the web and forces it to conform, at least in part, to the topography of the TAD fabric. Downstream from the transfer point, the web, carried on the TAD fabric, passes through a through-air dryer, where a flow of heated air, directed against the web and through the TAD fabric, dries the web to a desired degree. Finally, downstream from the through-air dryer, the web may be adhered to the surface of a Yankee dryer and imprinted thereon by the surface of the TAD fabric, for further and complete drying. The fully dried web is then removed from the surface of the Yankee dryer with a doctor blade, which foreshortens or crepes the web and increases its bulk. The foreshortened web is then wound onto rolls for subsequent processing, including packaging into a form suitable for shipment to and purchase by consumers.

As noted above, there are many methods for manufacturing bulk tissue products, and the foregoing description should be understood to be an outline of the general steps shared by some of the methods. For example, the use of a Yankee dryer is not always required, as, in a given situation, foreshortening may not be desired, or other means, such as "wet creping", may have already been taken to foreshorten the web.

The present application is concerned, at least in part, with the TAD fabrics used on the through-air dryer of a bulk tissue machine. Historically, TAD fabrics were woven from monofilament yarns in weave patterns which provided their paper-supporting surfaces with knuckles, elevated relative to other areas on the surfaces, having relatively long floats. Upon transfer from a forming fabric to the paper-contacting surface of such a TAD fabric, the embryonic paper web would assume, at least in part, the topography of that surface. As a consequence, the portions of the embryonic paper web deflected between the knuckles becomes less dense relative to those on the knuckles, ultimately giving the bulk tissue product softness and absorbency. Upon subsequent pressure transfer from the TAD fabric to the surface of a Yankee dryer, the knuckles on the paper-contacting surface of the TAD fabric imprint and densify those portions of the paper web lying thereon. This densification, in turn, strengthens the bulk tissue product as a whole. The densification was typically enhanced by abrading or sanding the paper-contacting surface of the TAD fabric to provide the knuckles with flat surfaces, thereby increasing the contact area between the paper web and the Yankee dryer, and enlarging the knuckle imprints to strengthen the bulk tissue product further and to dry it more completely.

Driven by consumer interest in softer, more absorbent and stronger bulk tissue products, development initially centered on the weave patterns used to produce TAD fabrics. For example, in the now expired U.S. Pat. Nos. 4,191,609 and 4,239,065 to Trokhan, which are assigned to the Procter & Gamble Company of Cincinnati, Ohio, TAD fabrics woven in weave patterns having nonnumerically consecutive warp-pick sequences are shown. The disclosed weave patterns provide the paper-supporting surfaces of the subject TAD fabrics with a plurality of wicker-basket-like cavities disposed in a bilaterally staggered array, each such cavity being bounded by knuckles on the top-surface plane of the fabric. The TAD fabrics enable a bulk tissue product, having a patterned array of relatively closely spaced uncompressed pillowlike zones, each zone being circumscribed by a picket-like lineament comprising alternately spaced areas of compacted fibers and relatively non-compacted fibers and formed by the top-surface-plane knuckles, to be produced.

During the 1980's, an alternate means for providing a TAD fabric with the equivalent of wicker-basket-like cavities was developed. Procter & Gamble's U.S. Pat. Nos. 4,528,239; 4,529,480; and 4,637,859 to Trokhan, which are among the earliest U.S. patent documents on these means, show a TAD belt comprising a foraminous woven element, that is, a woven base fabric, having a coating of a polymeric resin material in preselected areas. More specifically, the polymeric resin material provides the TAD belt with a macroscopically monoplanar, patterned, continuous network surface which serves to define within the TAD belt a plurality of discrete, isolated deflection conduits or holes, rather than wicker-basket-like cavities. To produce the TAD belt, the foraminous woven element is thoroughly coated with a liquid photosensitive resin to a controlled thickness above its upper surface, and a mask or a negative having opaque and transparent regions which define a desired pattern is brought into contact with the surface of the liquid photosensitive resin, and the resin is exposed to actinic radiation through the mask. The radiation, typically in the ultraviolet (UV) portion of the spectrum, cures the portions of the resin exposed through the mask, but does not cure the portions shadowed by the mask. The uncured resin is subsequently removed by washing to leave behind the foraminous woven element with a coating in the desired pattern formed by the cured resin.

The seminal U.S. patent disclosing this method is Procter & Gamble's U.S. Pat. No. 4,514,345 to Johnson et al. In addition to disclosing the method for making the TAD belt described in the preceding paragraph, this patent also shows a belt in which the polymeric resin material forms a plurality of discrete protuberances on its surface. That is to say, the pattern is the reverse of a continuous network having holes. Instead, the pattern is of discrete areas which are occluded or blocked by the polymeric resin material in an otherwise open foraminous woven element. Belts of this kind may be used in the forming section of a bulk tissue machine to form embryonic paper webs having discrete regions of relatively low basis weight in a continuous background of relatively high basis weight, as shown, for example, in Procter & Gamble's U.S. Pat. No. 5,277,761 to Van Phan et al. Belts of this kind may also be used to manufacture nonwoven articles and fabrics, which have discrete regions in which the density of fibers is less than that in adjacent regions, by processes such as hydroentanglement. Also in U.S. Pat. Nos. 6,080,691 and 6,120,642 to Kimberly-Clark there is disclosed a papermaking fabric for producing a soft, bulky tissue web wherein the web contact surface is a three dimensional porous nonwoven material. This material may be in the form of fiberous mats or web, extruded network or foams. Attachment of the porous nonwoven material can be by lamination, extrusion, adhesives, melt bonding, entanglement, welding, needling, nesting or layering.

In addition to discrete (non-continuous) and continuous networks of polymeric resin material on the foraminous woven element, the method disclosed in U.S. Pat. No. 4,514,345 to Johnson et al. may also be used to manufacture belts having semicontinuous networks of polymeric resin material. For example, Procter & Gamble's U.S. Pat. No. 5,714,041 to Ayers et al. shows a belt, useful as a TAD fabric, having a framework of protuberances arranged in a semicontinuous pattern to provide a semicontinuous pattern of deflection conduits. By "semicontinuous" is meant that each protuberance extends substantially throughout the belt in an essentially linear fashion, and that each protuberance is spaced apart from adjacent protuberances. As such, the protuberances may be lines which are generally straight, parallel and equally spaced from one another, or may be in the shape of zigzags which are generally parallel and equally spaced from one another.

In some bulk tissue applications, press fabrics having a continuous, semicontinuous or discrete network of polymeric resin material on their paper-contacting surfaces are used. By "press fabric" is meant a fabric normally used on the press section of a paper machine and comprising a base fabric or other support structure and one or more layers of staple fiber material attached to at least one side thereof. For example, Procter & Gamble's U.S. Pat. No. 5,556,509 to Trokhan et al. shows "press fabrics" having continuous and discrete networks of polymeric material on their paper-contacting surfaces and used to make bulk tissue products.

The method disclosed in U.S. Pat. No. 4,514,345, and the refinements thereto disclosed in subsequent Procter & Gamble U.S. patents, are quite elaborate and time-consuming. A more direct approach for providing a forming, press or TAD fabric, or a fabric used in the manufacture of nonwoven articles and fabrics by processes such as hydroentanglement, with a coating of a polymeric resin material in the form of a continuous, semicontinuous or discrete network has long been sought in the industries concerned. The present invention satisfies this long-felt need.

SUMMARY OF THE INVENTION

Accordingly, the present invention is a method for manufacturing a belt and a belt for use in the production of bulk tissue and towel, and of nonwoven articles and fabrics. The invention comprises a first step of providing a base substrate for the belt.

Polymeric resin material is then deposited onto the base substrate in a precise predetermined pattern, which predetermined pattern is to be imparted onto products manufactured with the belt. The polymeric resin material penetrates into the base substrate and, when desired, forms a layer of desired thickness thereover. The polymeric resin material is deposited in droplets having an average diameter of 10μ (10 microns) or more, and is then set or fixed by appropriate means. Subsequently, the coating of polymeric resin material may optionally be abraded to provide it with a uniform thickness and a smooth, macroscopically monoplanar surface.

The present invention will now be described in more complete detail, with frequent reference being made to the figures identified below.

DETAILED DESCRIPTION OF THE PREFERRED EMBODIMENTS

Figure 1:
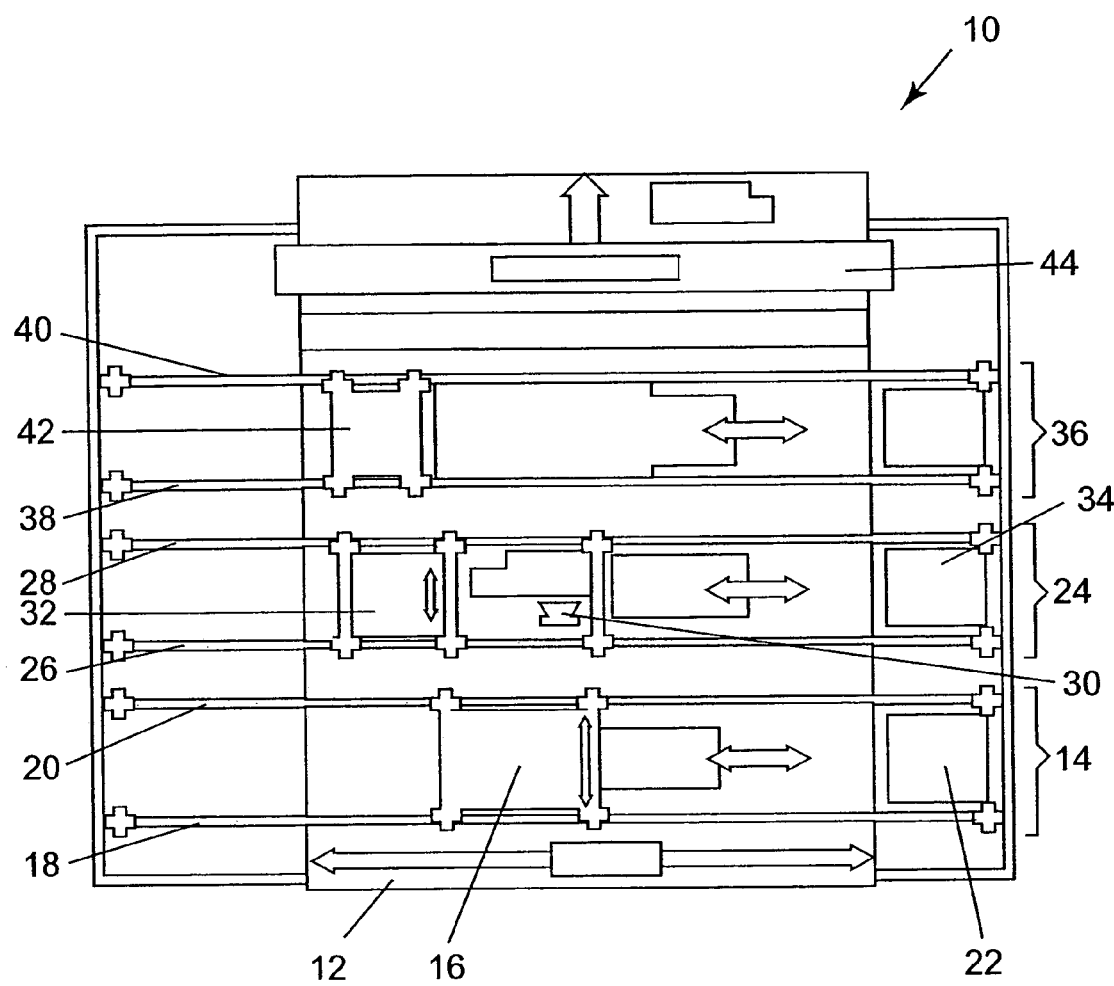
FIG. 1 is a schematic view of an apparatus used to manufacture papermaker's belts according to the method of the present invention.

The method for fabricating a belt in accordance with the present invention begins with the provision of a base structure or substrate. Typically, the base substrate is a fabric woven from monofilament yarns. More broadly, however, the base substrate may be a woven, nonwoven or knitted fabric comprising yarns of any of the varieties used in the production of paper machine clothing or of belts used to manufacture nonwoven articles and fabrics, such as monofilament, plied monofilament, multifilament and plied multifilament yarns. These yarns may be obtained by extrusion from any of the polymeric resin materials used for this purpose by those of ordinary skill in the art. Accordingly, resins from the families of polyamide, polyester, polyurethane, polyaramid, polyolefin and other resins may be used.

Alternatively, the base substrate may be composed of mesh fabrics, such as those shown in commonly assigned U.S. Pat. No. 4,427,734 to Johnson, the teachings of which are incorporated herein by reference. The base substrate may further be a spiral-link belt of the variety shown in many U.S. patents, such as U.S. Pat. No. 4,567,077 to Gauthier, the teachings of which are also incorporated herein by reference.

Moreover, the base substrate may be produced by spirally winding a strip of woven, nonwoven, knitted or mesh fabric in accordance with the methods shown in commonly assigned U.S. Pat. No. 5,360,656 to Rexfelt et al., the teachings of which are incorporated herein by reference. The base substrate may accordingly comprise a spirally wound strip, wherein each spiral turn is joined to the next by a continuous seam making the base substrate endless in a longitudinal direction.

The above should not be considered to be the only possible forms for the base substrate. Any of the varieties of base substrate used by those of ordinary skill in the paper machine clothing and related arts may alternatively be used.

Once the base substrate has been provided, one or more layers of staple fiber batt may optionally be attached to one or both of its two sides by methods well known to those of ordinary skill in the art. Perhaps the best known and most commonly used method is that of needling, wherein the individual staple fibers in the batt are driven into the base structure by a plurality of reciprocating barbed needles. Alternatively, the individual staple fibers may be attached to the base substrate by hydroentangling, wherein fine high-pressure jets of water perform the same function as the above-mentioned reciprocating barbed needles. It will be recognized that, once staple fiber batt has been attached to the base substrate by either of these or other methods known by those of ordinary skill in the art, one would have a structure identical to that of a press fabric of the variety generally used to dewater a wet paper web in the press section of a paper machine.

Alternatively still, the base substrate may be a structure which has been rendered impermeable to fluids, such as air and water, with a coating of a polymeric resin material, which at least partially impregnates the structure and which may form a layer of a desired thickness on one of its two sides. An impermeable base substrate may be used in the present invention in the manufacture of an embossing belt of the variety shown in U.S. Pat. No. 6,340,413, the teachings of which are incorporated herein by reference. The embossing belt disclosed therein is essentially impermeable and comprises a rear layer and a web-contacting layer, which has a large number of uniformly distributed depressions and, positioned therebetween, surface portions for forming a corresponding relief pattern in a fibrous web passing through a press section of a paper machine. The embossing belt also transfers the embossed fibrous web to the dryer section of the paper machine.

Furthermore, structures of this type, whether permeable or not, can have a random surface topography. This topography can be repeated within a structure, or obviously, repeated in a subsequent structure produced for the same paper, tissue or nonwoven production machine. Fabrics of this type are taught in U.S. Pat. Nos. 6,080,691 and 6,120,642, the disclosures of which are incorporated herein by reference.

The belts manufactured in accordance with the present invention may be used on the forming, press or through air-drying sections of a paper machine, especially those producing tissue or towel products, or on a machine used to manufacture nonwoven articles and fabrics by processes such as hydroentanglement. Those having a needled batt-on-base substrate are most suitable for use on a press section, while those lacking staple fiber batt may find use on any of these sections or machines. In some cases, it may be necessary to apply an initial layer or additional batt to the structure after application of the resin. In such cases the patterned resin may lie below a layer of batt fibers.

Once the base substrate, with or without the addition of staple fiber batt material, has been provided, it is mounted on the apparatus 10 shown schematically in FIG. 1. It should be understood that the base substrate may be either endless or seamable into endless form during installation on a paper machine. As such, the base substrate 12 shown in FIG. 1 should be understood to be a relatively short portion of the entire length of the base substrate 12. Where the base substrate 12 is endless, it would most practically be mounted about a pair of rolls, not illustrated in the figure but most familiar to those of ordinary skill in the paper machine clothing arts. In such a situation, apparatus 10 would be disposed on one of the two runs, most conveniently the top run, of the base substrate 12 between the two rolls. Whether endless or not, however, the base substrate 12 is preferably placed under an appropriate degree of tension during the process. Moreover, to prevent sagging, the base substrate 12 may be supported from below by a horizontal support member as it moves through apparatus 10.

Referring now more specifically to FIG. 1, where the base substrate 12 is indicated as moving in an upward direction through the apparatus 10 as the method of the present invention is being practiced, apparatus 10 comprises a sequence of several stations through which the base substrate 12 may pass incrementally as a belt is being manufactured therefrom.

In the first station, the polymer deposition station 14, a piezojet array 16 mounted on transverse rails 18,20 and translatable thereon in a direction transverse to that of the motion of the base substrate 12 through the apparatus 10, as well as therebetween in a direction parallel to that of the motion of the base substrate 12, is used to deposit polymeric in repeated steps to build up the desired amount of resin material onto the base substrate 12 in a predetermined pattern.

Alternatively, other means for depositing the small droplets required for the practice of the present invention, as will be discussed below, may be known to those of ordinary skill in the art or may be developed in the future, and may be used in the practice of the present invention. In addition, the deposit of the material need not only be traversing the movement of the base substrate but can be parallel to such movement, spiral to such movement or in any other manner suitable for the purpose.

The polymeric resin material penetrates into the base substrate, and, when desired, forms a layer of a desired thickness thereover, in the predetermined pattern. That pattern may be a continuous network extending substantially throughout both dimensions of the surface of the base substrate 12 and defining an array of discrete open areas which are to be the ultimate locations of a corresponding array of discrete holes or passages for fluid through the belt being manufactured from the base substrate 12, or on the surface of the belt of the base substrate 12. It is also envisioned for some applications that the belt need not be permeable. In this case the substrate may be a support base already impregnated with a resin, and having no fluid permeability or the substrate may be an extruded polymer film or even a metal band. The discrete open areas may form outlines or other representations of familiar objects, such as clouds, flowers, swans or leaves, or of corporate or company logos, which are to appear in the desired array on the product to be manufactured on the belt. Moreover, the array of outlines may be superimposed on a background array of smaller discrete holes.

Alternatively, the polymeric resin material may be deposited in a semicontinuous network, for example, a semicontinuous pattern extending substantially throughout the base substrate 12 in an essentially linear fashion, thereby forming lines which are generally parallel and equally spaced from one another. Such lines may be either straight, curved or zigzag. More generally, a semicontinuous network comprises straight or curved lines, or lines having both straight and curved segments, which are spaced apart from one another and do not cross one another.

Alternatively still, the polymeric resin material may be deposited in an array of discrete locations. It should be appreciated that the polymeric resin material may be deposited in a manner forming an outline or other representation of a familiar object, such as a cloud, flower, swan or leaf, or of a corporate or company logo, which is to appear in the desired array on the product to be manufactured on the belt. Moreover, the array of outlines may be superimposed on a background array of smaller discrete locations on which the polymeric resin material is deposited.

In each case, the polymeric resin material impregnates and blocks the passages through the base substrate 12, and, when desired, rises to a predetermined height above the surface of the base substrate 12, at the locations where it is deposited. As such, the polymeric resin material could ultimately reside entirely within the surface plane of the base substrate 12, even with the surface plane of the base substrate 12, or above the surface plane of the base substrate 12.

The piezojet array 16 comprises at least one but preferably a plurality of individual computer-controlled piezojets, each functioning as a pump whose active component is a piezoelectric element. As a practical matter, an array of up to 256 piezo jets or more may be utilized, if the technology permits. The active component is a crystal or ceramic which is physically deformed by an applied electric signal. This deformation enables the crystal or ceramic to function as a pump, which physically ejects a drop of a liquid material each time an appropriate electric signal is received. As such, this method of using piezojets to supply drops of a desired material repeatedly so as to build up the desired amount of material in the desired shape in response to computer-controlled electric signals is commonly referred to as a "drop-on-demand" method.

The degree of precision of the jet in depositing the material will depend upon the dimensions and shape of the structure being formed. The type of jet used and the viscosity of the material being applied will also impact the precision of the jet selected.

Figure 7:
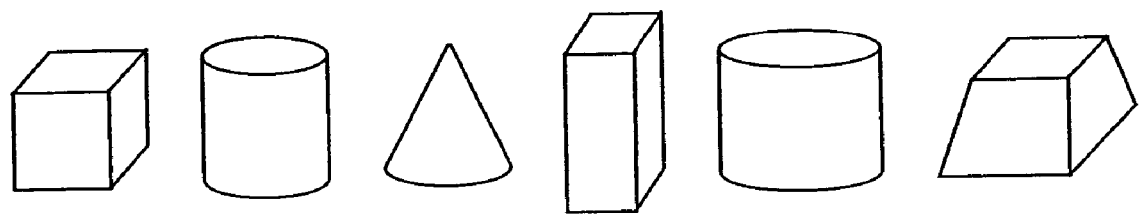
FIG. 7 is a perspective view of a variety of representative shapes of the deposited material.

Referring again to FIG. 1, the piezojet array 16, starting from an edge of the base substrate 12, or, preferably, from a reference thread extending lengthwise therein, translates lengthwise and widthwise across the base substrate 12, while the base substrate 12 is at rest, deposits the polymeric resin material in the form of extremely small droplets having a nominal diameter of $10\mu$ (10 microns) or more such as, of $50\mu$ (50 microns), or $100\mu$ (100 microns), in one of the above-described patterns. The translation of the piezojet array 16 lengthwise and widthwise relative to the base substrate 12, and the deposition of droplets of the polymeric resin material from each piezojet in the array 16, are controlled by computer in a controlled manner to produce the predetermined pattern of the polymeric resin material in a controlled geometry in three planes length, width and depth or height (x, y, z dimensions or direction) within, and, when desired, on the base substrate 12. One or more passes over the base substrate 12 may be made by piezojet array 16 to deposit the desired amount of material and to create the desired shape. In this regard, the deposits can take any number of shapes as illustrated generally in FIG. 7. The shapes can be square, round conical, rectangular, oval, trapezoidal etc. with a thicker base tapering upward. Depending upon the design chosen, the amount of material deposited can be layered in decreasing fashion as the jet repeatedly passes over the deposit area.

In the present invention, in which a piezojet array is used to deposit polymeric resin material onto or within selected areas of the surface of the base substrate 12, the choice of polymeric resin material is limited by the requirement that its viscosity be 100 cps (100 centipoise) or less at the time of delivery, that is, when the polymeric resin material is in the nozzle of a piezojet ready for deposition, so that the individual piezojets can provide the polymeric resin material at a constant drop delivery rate. In this regard, the viscosity of the polymeric resin material at the point of delivery in conjunction with the jet size is important in deferring the size and shape of the droplets formed on the base substrate 12 and in time the resolution of the pattern ultimately achieved. Another requirement limiting the choice of polymeric resin material is that it must partially set during its fall, as a drop, from a piezojet to the base substrate 12, or after it lands on the base substrate 12, to prevent the polymeric resin material from flowing and to maintain control over the polymeric resin material to ensure its deposition in the desired pattern. Suitable polymeric resin materials which meet these criteria are:

1. Hot melts and moisture-cured hot melts;
2. Two-part reactive systems based on urethanes and epoxies;
3. Photopolymer compositions consisting of reactive acrylated monomers and acrylated oligomers derived from urethanes, polyesters, polyethers, and silicones; and
4. Aqueous-based latexes and dispersions and particle-filled formulations including acrylics and polyurethanes.

As noted above, the piezojet array 16 is capable of supplying the polymeric resin material in the form of extremely small droplets having an average diameter of $10\mu$ (10 microns) or more, so long as its viscosity is less than 100 cps (100 centipoise) or less at the time of delivery. Moreover, the piezojet array 16 can deposit the polymeric resin material with great precision one layer at a time, making it unnecessary to grind the surface of a layer formed thereby on the base substrate 12 to achieve a uniform thickness, and enables one of ordinary skill in the art to control the z-direction geometry of the polymeric resin material. That is to say, the piezojet array 16 can deposit the polymeric resin material with such precision that the surface will be monoplanar without having to be ground or, alternatively, that the surface will have some predetermined three-dimensional structure.

That is to say by depositing the droplets in a repeating pattern, that being by layering one droplet on the top of the next, the height or z-direction of the polymeric resin material on the base substrate 12 is controlled and may be uniform, varied or otherwise adjusted as desired. Further, some of the individual piezojets in the piezojet array may be used to deposit one polymeric resin material, while others may be used to deposit a different polymeric resin material, to produce a surface having microregions of more than one type of polymeric resin material. It is understood that one or more passes of jet array 16 may be required to apply the required polymer resin material onto the base substrate 12.

Moreover, in an alternative embodiment of the present invention, the piezojet array 16 may include one or more bulk jets, which deposit polymeric resin material onto the base substrate 12, at a rate greater than that at which it can be deposited by piezojets. The choice of the polymeric resin material to be deposited by the bulk jets is not governed by the viscosity requirement for the polymeric resin material being deposited by the piezojets. As such, a wider variety of polymeric resin materials, such as pdlyurethane and photosensitive resins, may be deposited using the bulk jets. In practice, the bulk jets are used to deposit the "bulk" of the polymeric resin material onto the base substrate 12 at crude resolution, while the piezojets are used to refine the details of the pattern produced by the polymeric resin material on the base substrate 12 at higher resolution. The bulk jets may operate prior to or simultaneously with the piezojets. In this manner, the entire process of providing a base substrate 12 with a pattern of a polymeric resin material can proceed more quickly and efficiently.

It should be understood that the polymeric resin material needs to be fixed on or within the base substrate 12 following its deposition thereon. The means by which the polymeric resin material is set or fixed depends on its own physical and/or chemical requirements. Photopolymers are cured with light, whereas hot-melt materials are set by cooling. Aqueous based latexes and dispersions are dried and then cured with heat, and reactive systems are cured by heat. Accordingly, the polymeric resin materials may be set by curing, cooling, drying or any combination thereof.

The proper fixing of the polymeric resin material is required to control its penetration into and distribution within the base substrate 12, that is, to control and confine the material within the desired volume of the base substrate 12. Such control is important below the surface plane of the base substrate 12 to prevent wicking and spreading. Such control may be exercised, for example, by maintaining the base substrate 12 at a temperature which will cause the polymeric resin material to set quickly upon contact. Control may also be exercised by using such materials having well-known or well-defined curing or reaction times on base substrates having a degree of openness such that the polymeric resin material will set before it has time to spread beyond the desired volume of the base substrate 12.

When the pattern has been completed in a band between the transverse rails 18,20 across the base substrate 12, the base substrate 12 is advanced lengthwise an amount equal to the width of the band, and the procedure described above is repeated to produce the predetermined pattern in a new band adjacent to that previously completed. In this repetitive manner, the entire base substrate 12 can be provided with the predetermined pattern. Note the pattern can be random, a repeating random pattern on a base substrate or such patterns that are repeatable from belt to belt for quality control.

Alternatively, the piezojet array 16, again starting from an edge of the base substrate 12, or, preferably, from a reference thread extending lengthwise therein, is kept in a fixed position relative to the transverse rails 18,20, while the base substrate 12 moves beneath it, to deposit the polymeric resin material in the desired pattern in a lengthwise strip around the base substrate 12. Upon completion of the lengthwise strip, the piezojet array 16 is moved widthwise on transverse rails 18,20 an amount equal to the width of the lengthwise strip, and the procedure described above is repeated to produce the predetermined pattern in a new lengthwise strip adjacent to that previously completed. In this repetitive manner, the entire base substrate 12 can be provided with the predetermined pattern.

The surface is usually the contacting surface with the paper, tissue, towel or nonwoven producted to be produced. It is envisioned that some products/processes will require this resin to be primarily on the nonproduct contact surface. In this case fluid flow or mechanical pressure differences that occur when the belt and the produced products are in contact will still cause local density or texture differences.

At one end of the transverse rails 18,20, a jet check station 22 is provided for testing the flow of polymeric resin material from each jet. There, the jets can be purged and cleaned to restore operation automatically to any malfunctioning jet unit.

In the second station, the imaging/repair station 24, transverse rails 26,28 support a digital imaging camera 30, which is translatable across the width of base substrate 12, and a repair-jet array 32, which is translatable both across the width of the base substrate 12 and lengthwise relative thereto between transverse rails 26,28, while the base substrate 12 is at rest.

The digital imaging camera 30 views the deposited polymeric resin material to locate any faulty or missing discrete elements or similar irregularities in a semicontinuous or continuous pattern produced thereby on the base substrate 12. Comparisons between the actual and desired patterns are made by a fast pattern recognizer (FPR) processor operating in conjunction with the digital imaging camera 30. The FPR processor signals the repair jet array 32 to deposit additional polymeric resin material onto the elements detected to be faulty or missing. As before, at one end of the transverse rails 26,28, a repair-jet check station 34 is provided for testing the flow of material from each repair jet. There, each repair jet can be purged and cleaned to restore operation automatically to any malfunctioning repair jet unit.

In the third station, the optional setting station 36, transverse rails 38,40 support a setting device 42, which may be required to set the polymeric resin material being used. The setting device 42 may be a heat source, for example, an infrared, hot air, microwave or laser source; cold air; or an ultraviolet or visible light source, the choice being governed by the requirements of the polymeric resin material being used.

Finally, the fourth and last station is the optional grinding station 44, where an appropriate abrasive is used to provide any polymeric resin material above the surface plane of the base substrate 12 with a uniform thickness and a smooth, macroscopically monoplanar surface. The optional grinding station 44 may comprise a roll having an abrasive surface, and another roll or backing surface on the other side of the base substrate 12 to ensure that the grinding will result in a uniform thickness and a smooth, macroscopically monoplanar surface.

Figure 2:
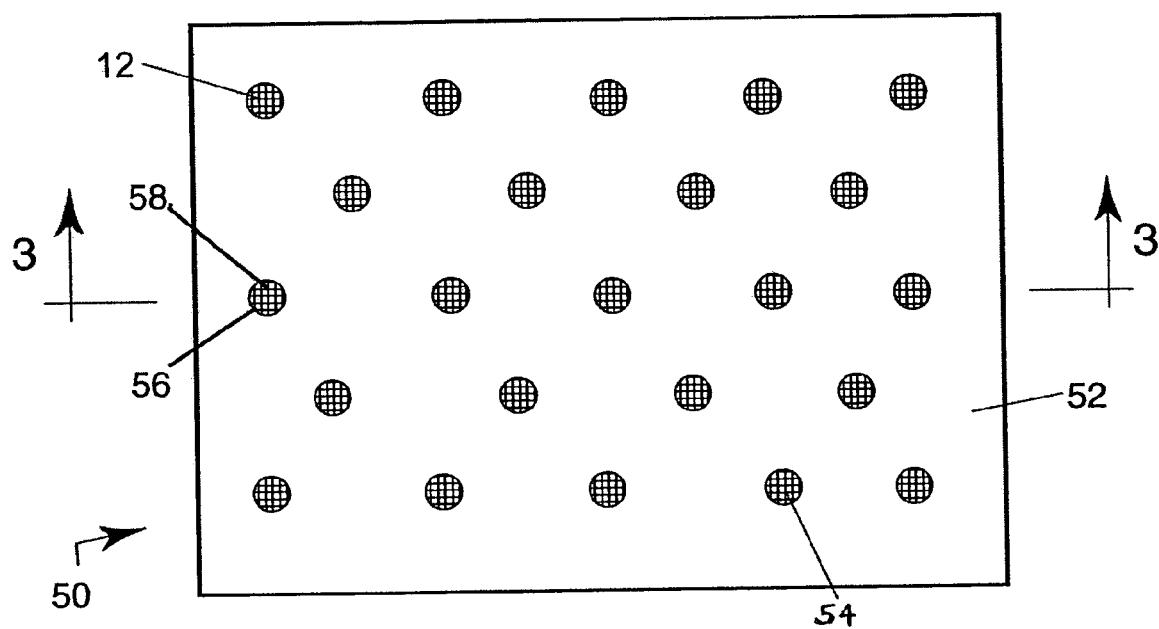
FIG. 2 is a plan view of a completed belt as it would appear upon exit from the apparatus of FIG. 1.

As an example, reference is now made to FIG. 2, which is a plan view of a completed belt 50 as it would appear upon exit from optional setting station 36 and the optional grinding station 44 of apparatus 10. The belt 50 has a coating of polymeric resin material 52 except for a plurality of discrete holes 54 in a predetermined pattern. A portion of a permeable base substrate 12, which comprises a system of machine-direction (MD) yarns 56 interwoven with a system of cross-machine-direction (CD) yarns 58, is visible in each of the discrete holes 54.

Figure 3:
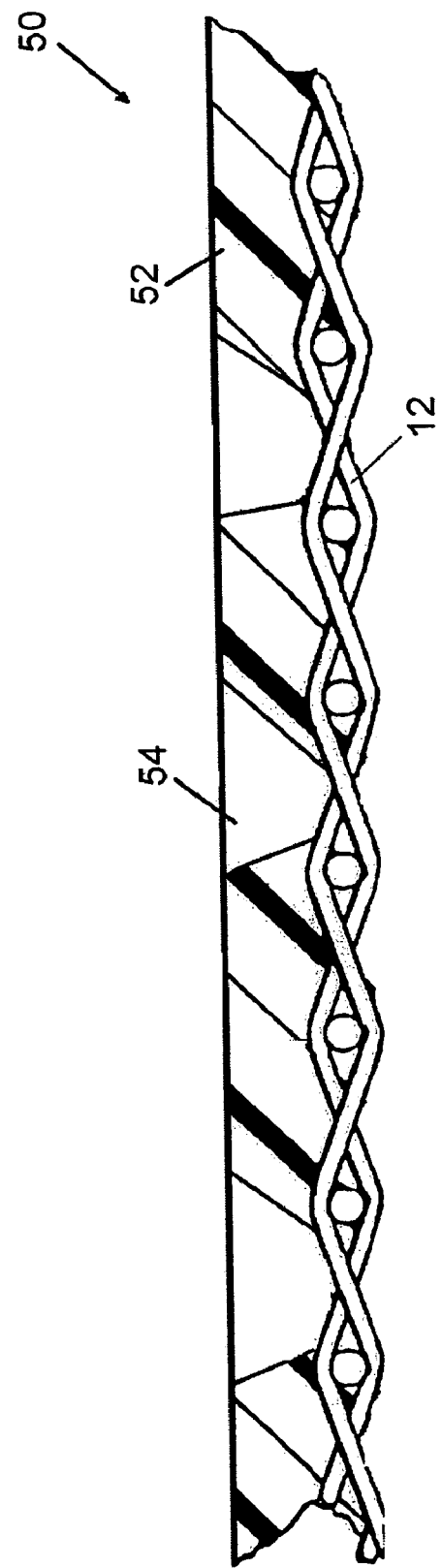
FIG. 3 is a cross-sectional view taken as indicated in FIG. 2.

FIG. 3 is a cross-sectional view of a completed belt 50 taken as indicated in FIG. 2. In this example, polymeric resin material 52 forms a layer of a desired thickness over the base substrate 12, except for the areas represented by the discrete passages 64.

Figure 4:
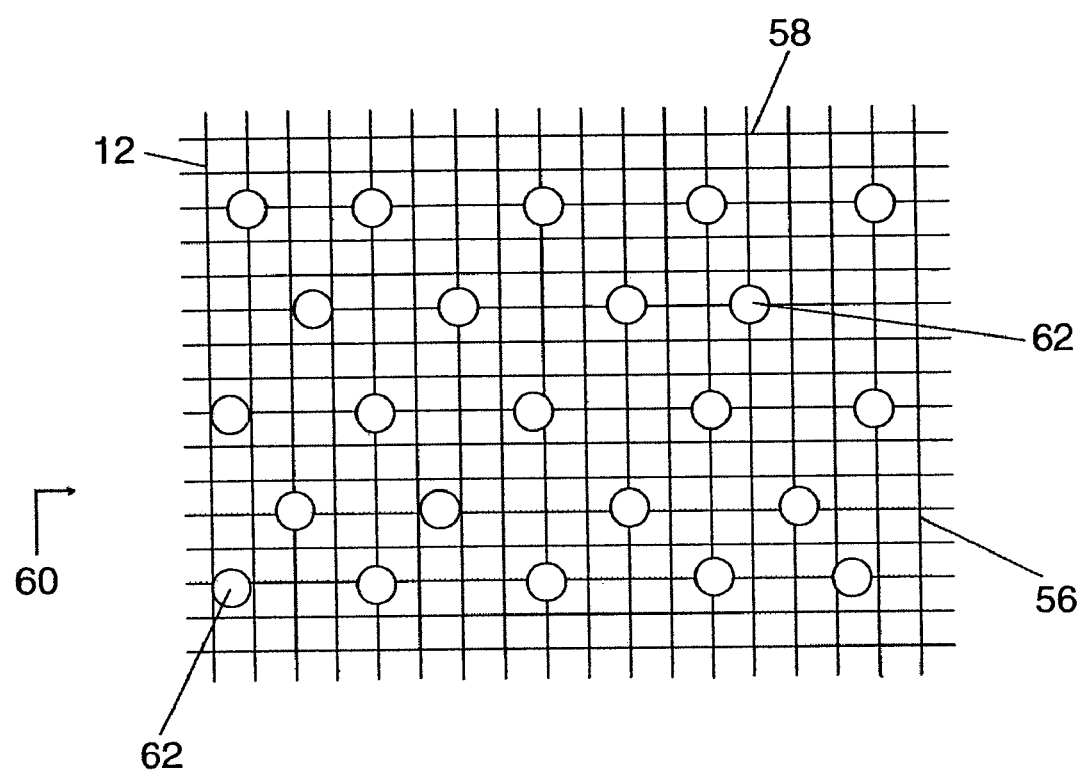
FIG. 4 is a plan view of a second embodiment of the belt.
Figure 5:
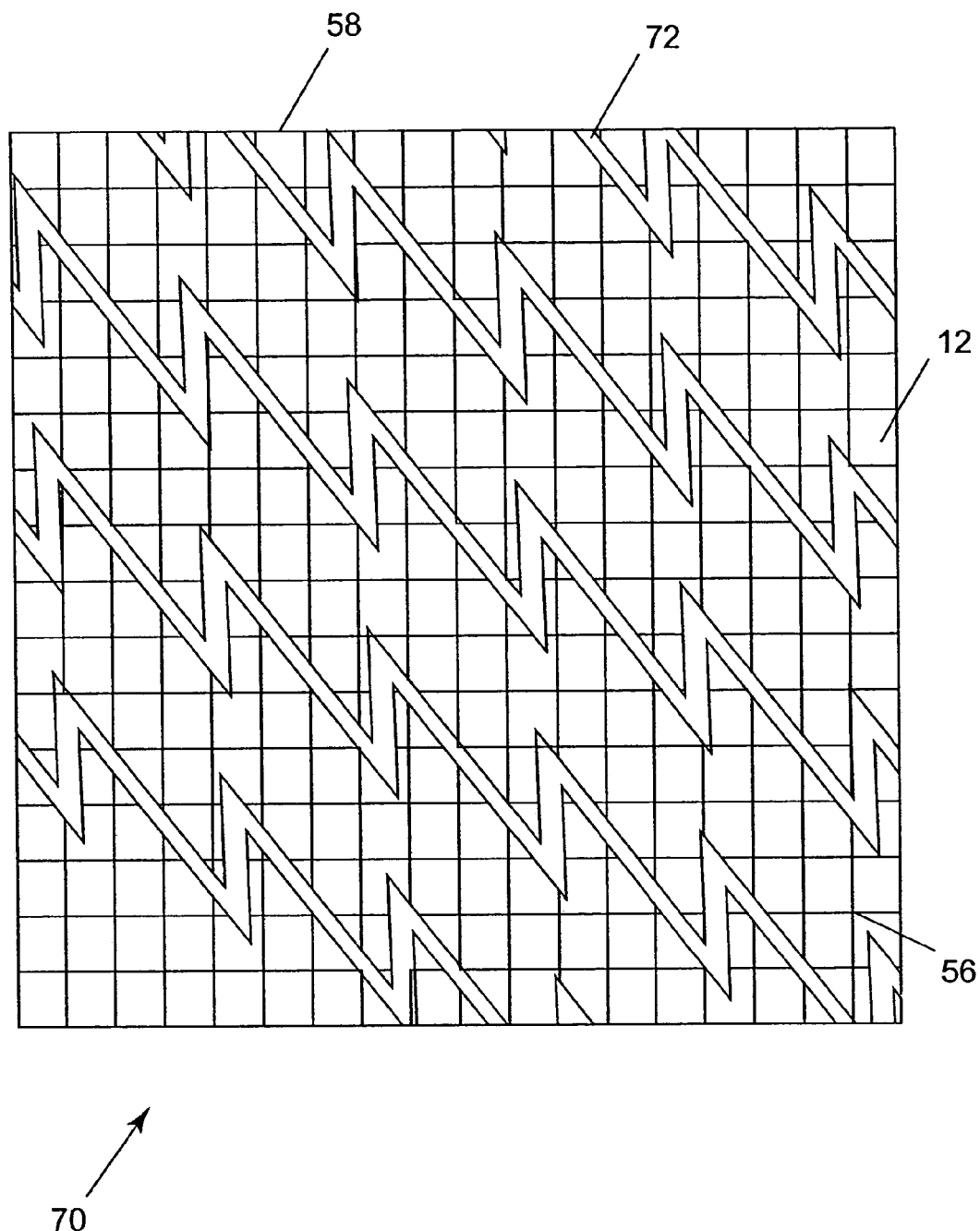
FIG. 5 is a plan view of a third embodiment of the belt.

Alternative embodiments of the belt are shown in FIGS. 4 and 5. FIG. 4 is a plan view of a belt 60 whose base substrate 12 has a plurality of discrete areas 62 of polymeric resin material in a predetermined array. Such a belt 60 may be used in the forming section of a papermaking machine.

FIG. 5 is a plan view of a belt 70 having a semicontinuous network of polymeric resin material on its surface. The semicontinuous network extends substantially throughout the belt 70 in an essentially linear fashion. Each portion 72 of the semicontinuous network extends in a substantially straight line, which may zigzag to some extent, parallel to others making up the network. Each portion 72 is of polymeric resin material.

Figure 6:
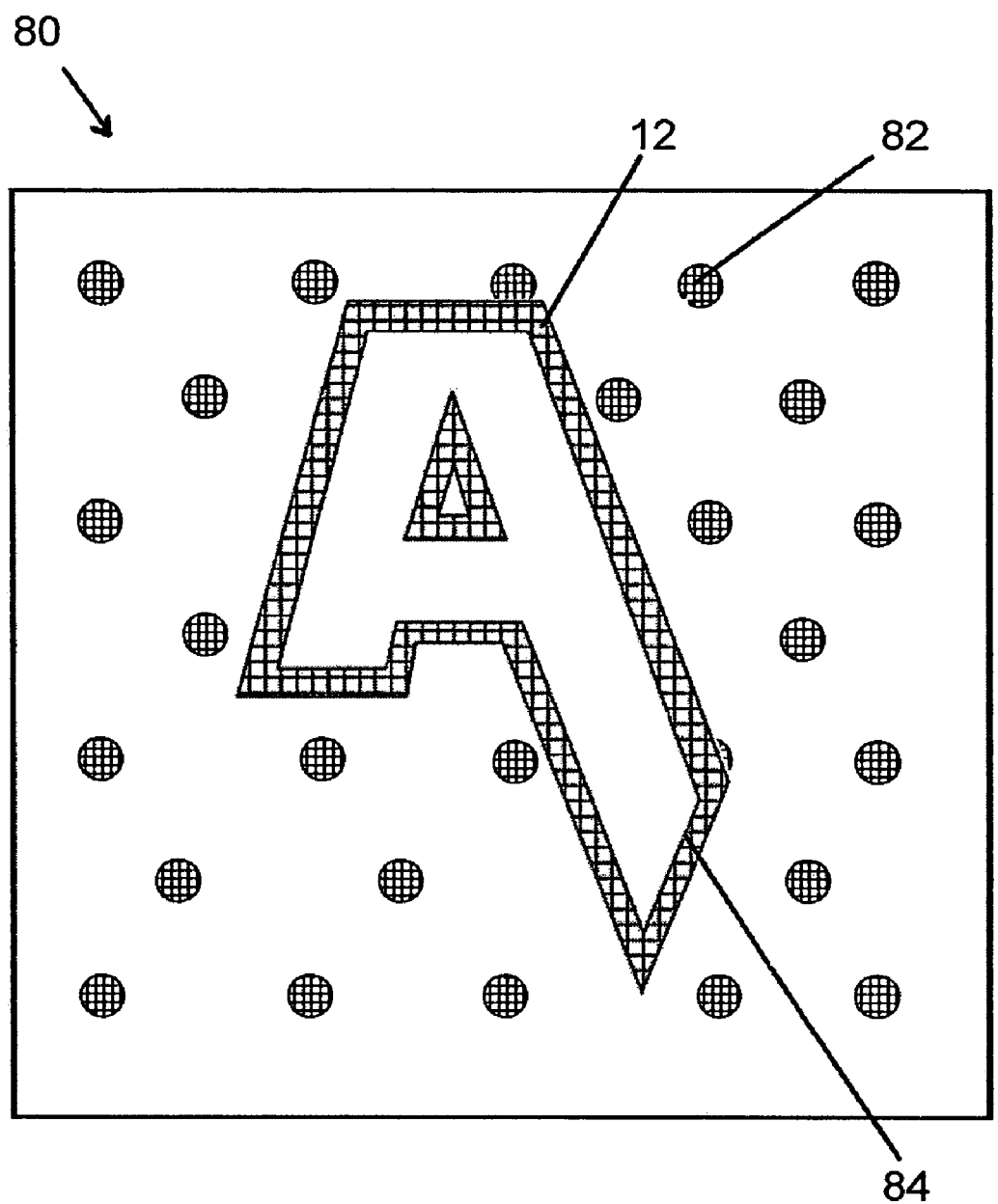
FIG. 6 is a plan view of a belt of the variety shown in FIG. 2 having an additional pattern superimposed upon a pattern of discrete passages.

FIG. 6 is a plan view of a belt 80 of the variety shown in FIG. 2 having an additional pattern superimposed upon a pattern of discrete passages 82. The additional pattern 84, which is a logo, but which may also be a familiar object, may also be repeated in a desired array on the belt 80. A portion of the permeable base substrate 12 is visible in each of the discrete passages 82, as well as in the additional pattern 84.

In an alternate embodiment of the present invention, the polymer deposition station 14, the imaging/repair station 24, and the setting station 36 may be adapted to produce a belt from the base substrate 12 in a spiral technique, rather than indexing in the cross-machine direction as described above. In a spiral technique, the polymer deposition station 14, the imaging/repair station 24, and the setting station 36 start at one edge of the base substrate 12, for example, the left-hand edge in FIG. 1, and are gradually moved across the base substrate 12, as the base substrate 12 moves in the direction indicated in FIG. 1. The rates at which the stations 14,24,36 and the base substrate 12 are moved are set so that the pattern desired in the finished belt is spiralled onto the base substrate 12 in a continuous manner. In this alternative, the polymeric resin material deposited by the polymer deposition station 14, and imaging/repair station 24 may be partially set or fixed as each spiral passes beneath the setting device 42, and completely set when the entire base substrate 12 has been processed through the apparatus 10.

Alternatively, where the piezojet array 16 deposits the polymeric resin material in the desired pattern in a lengthwise strip around the base substrate 12, the imaging/repair station 24 and the setting station 36 may also be kept in a fixed position aligned with the piezojet array 16, while the base substrate 12 moves beneath them, so that the pattern desired in the finished belt is applied to a lengthwise strip around the base substrate 12. Upon completion of the lengthwise strip, the piezojet array 16, the imaging/repair station 24 and the setting station 36 are moved widthwise an amount equal to the width of the lengthwise strip, and the procedure is repeated for a new lengthwise strip adjacent to that previously completed. In this repetitive manner the entire base structure 12 can be completely coated.

Furthermore, the entire apparatus can remain in a fixed position with the material processed. It should be noted that the material need not be a full width belt but can be a strip of material such as that disclosed in U.S. Pat. No. 5,360,656 to Rexfelt, the disclosure of which is incorporated herein by reference, and subsequently formed into a full width belt. The strip can be unwound and wound up on a set of rolls after fully processing. These rolls of belting materials can be stored and can then be used to form an endless full width structure using, for example, the teachings of the immediately aforementioned patent.

Modifications to the above would be obvious to those of ordinary skill in the art, but would not bring the invention so modified beyond the scope of the appended claims. In particular, while piezojets are disclosed above as being used to deposit the polymeric resin material in preselected locations on the base substrate, other means for depositing droplets thereof in the size range desired may be known to those of ordinary skill in the art or may be developed in the future, and such other means may be used in the practice of the present invention. For example, in processes requiring a relatively larger scale pattern such that the final elements such as round hemispheres, a relatively large, even a single resin deposition nozzle can comprise the entire jet array. The use of such means would not bring the invention, if practiced therewith, beyond the scope of the appended claims.

What is claimed is:

1. A method for manufacturing a belt for use in the production of bulk tissue and towel, and of nonwoven articles and fabrics, said method comprising the steps of;
    a) providing a base substrate for the belt;
    b) depositing polymeric resin material onto said base substrate in a controlled manner so as to control the x, y, z dimensions of the material deposited to create a predetermined pattern of deposits, wherein each deposit comprises one or more droplets of polymeric resin material; and
    c) at least partially setting said polymeric resin material.

2. A method as claimed in claim 1 wherein said droplets have an average diameter of 10µ (10 microns) or more.

3. A method as claimed in claim 1 wherein steps b) and c) are performed sequentially on successive bands extending widthwise across said base substrate.

4. A method as claimed in claim 1 wherein steps b) and c) are performed sequentially on successive strips extending lengthwise around said base substrate.

5. A method as claimed in claim 1 wherein steps b) and c) are performed spirally around said base substrate.

6. A method as claimed in claim 1 wherein, in step b), said predetermined pattern comprises a plurality of discrete locations set forth in a predetermined array.

7. A method as claimed in claim 1 wherein, in step b), said predetermined pattern comprises a continuous network defining a plurality of discrete open areas in a predetermined array.

8. A method as claimed in claim 1 wherein, in step b), said predetermined pattern comprises a semicontinuous network extending substantially throughout said base substrate.

9. A method as claimed in claim 1 wherein, in step b), said polymeric resin material penetrates into said base substrate.

10. A method as claimed in claim 1 wherein, in step b), said polymeric resin material forms a uniform or random pattern layer of desired thickness over said base substrate.

11. A method as claimed in claim 1 wherein, in step b), said polymeric resin material is deposited by a piezo-jet means.

12. A method as claimed in claim 1 wherein, in step b), said polymeric resin material is deposited by a piezo-jet array comprising a plurality of individual computer-controlled piezo-jets.

13. A method as claimed in claim 1 further comprising, between steps b) and c), the steps of:
    i) checking the actual pattern of said polymeric resin material to measure conformity to said predetermined pattern to measure conformity to said predetermined pattern; and
    ii) repairing said actual pattern of said polymeric resin material to eliminate departures from said predetermined pattern.

14. A method as claimed in claim 13 wherein said checking step is performed by a fast pattern recognizer (FPR) processor operating in conjunction with a digital imaging camera.

15. A method as claimed in claim 14 wherein said repairing step is performed by a repair-jet array coupled to said FPR processor.

16. A method as claimed in claim 1, wherein said polymeric resin material is selected from the group consisting of:
    1. hot melts and moisture-cured hot melts;
    2. two-part reactive systems based on urethanes and epoxies;
    3. photopolymer compositions consisting of reactive acrylated monomers and acrylated oligomers derived from urethanes, polyesters, polyethers, and silicones; and
    4. aqueous-based latexes and dispersions and particle-filled formulations including acrylics and polyurethanes.

17. A method as claimed in claim 1 wherein said curing step is performed by exposing said polymeric resin material to a heat source.

18. A method as claimed in claim 1 wherein said curing step is performed by exposing said polymeric resin material to cold air.

19. A method as claimed in claim 1 wherein said curing step is performed by exposing said polymeric resin material to actinic radiation.

20. A method as claimed in claim 1 wherein a first polymeric resin material is deposited and a second polymeric resin is deposited which is different from the first polymeric resin material.

21. A method as claimed in claim 10 wherein said polymeric resin material is deposited in a uniformly thick layer having a monoplanar surface.

22. A method as claimed 10 wherein said polymeric resin material is deposited in a nonuniformly thick layer having a surface with a three-dimensional structure.

23. A method as claimed in claim 1 further comprising the step of depositing a polymeric resin material onto said base substrate in said predetermined pattern with a bulk jet to accelerate the manufacture of said belt.

24. A method as claimed in claim 23 wherein said depositing step is carried out prior to step c).

25. A method as claimed in claim 23 wherein said depositing step is carried out simultaneously with step c).

26. A method as claimed in claim 1 further comprising the step of abrading said polymeric resin material deposited on said base substrate to provide said polymeric resin material with a uniform thickness and a smooth, macroscopically monoplanar surface.

27. A method as claimed in claim 1 which includes the step of providing a base substrate taken from the group consisting essentially of woven, nonwoven, spiral formed, spiral-link, knitted, mesh or strips of material which are ultimately wound to form a belt having a width greater than a width of the strips.

28. A belt for use in the production of bulk tissue and towel, and of nonwoven articles and fabrics, said belt comprising:
 a base substrate; and
 an x, y, z dimensionally controlled pattern of polymeric resin material deposits, said deposits comprising one or more droplets of polymeric resin material wherein said belt is made in a manner comprising the steps of:
 a) providing a base substrate for the belt;
 b) depositing polymeric resin material onto said base substrate in a controlled manner so as to control the x, y, z dimensions of the material deposited to create a predetermined pattern of deposits, wherein each deposit comprises one or more droplets of polymeric resin material; and
 c) at least partially setting said polymeric resin material.

29. A belt as claimed in claim 28 wherein said droplets have an average diameter of $10\mu$ (10 microns) or more.

30. A belt as claimed in claim 29 wherein steps b) and c) are performed sequentially on successive strips extending lengthwise around said base substrate.

31. A belt as claimed in claim 28 wherein steps b) and c) are performed sequentially on successive strips extending lengthwise around said base substrate.

32. A belt as claimed in claim 28 wherein steps b) and c) are performed spirally around said base substrate.

33. A belt as claimed in claim 28 wherein, in step b), said predetermined pattern comprises a plurality of discrete locations set forth in a predetermined array.

34. A belt as claimed in claim 28 wherein, in step b), said predetermined pattern comprises a continuous network defining a plurality of discrete open areas in a predetermined array.

35. A belt as claimed in claim 28 wherein, in step b), said predetermined pattern comprises a semicontinous network extending substantially throughout said base substrate.

36. A belt as claimed in claim 28 wherein, in step b), said polymeric resin material penetrates into said base substrate.

37. A belt as claimed in claim 28 wherein, in step b), said polymeric resin material forms a uniform or random pattern layer of desired thickness over said base substrate.

38. A belt as claimed in claim 28, wherein said polymeric resin material is selected from the group consisting of:
 1. hot melts and moisture-cured hot melts;
 2. two-part reactive systems based on urethanes and epoxies;
 3. photopolymer compositions consisting of reactive acrylated monomers and acrylated oligomers derived from urethanes, polyesters, polyethers, and silicones; and
 4. aqueous-based latexes and dispersions and particle-filled formulations including acrylics and polyurethanes.

39. A belt as claimed in claim 28 wherein a first polymeric resin material is deposited and a second polymeric resin material is deposited which is different from the first polymeric resin material.

40. A belt as claimed in claim 37 wherein said polymeric resin material is deposited in a uniformly thick layer having a monoplanar surface.

41. A belt as claimed in claim 37 wherein said polymeric resin material is deposited in a nonuniformely thick layer having a surface with a three-dimensional structure.

42. A belt as claimed in claim 28 further comprising the step of depositing a polymeric resin material onto said base substrate in said predetermined pattern with a bulk jet to accelerate the manufacture of said belt.

43. A belt as claimed in claim 28 wherein said depositing step is carried out prior to step c).

44. A belt as claimed in claim 28 wherein said depositing step is carried out simultaneously with step c).

45. A belt as claimed in claim 28 further comprising the step of abrading said polymeric resin material deposited on said base substrate to provide said polymeric resin material with a uniform thickness and a smooth, macroscopically monoplanar surface.

46. A belt as claimed in claim 28 further comprising the step of providing a base substrate taken from the group consisting essentially of woven, nonwoven, spiral formed, spiral-link, knitted, mesh or strips of material which are ultimately spiral wound to form a belt having a width greater than a width of the strips.

\* \* \* \* \*